(12) United States Patent
Abedini et al.

(10) Patent No.: US 10,341,946 B2
(45) Date of Patent: Jul. 2, 2019

(54) FREQUENCY SCAN IN NR WIRELESS COMMUNICATION

(71) Applicant: QUALCOMM Incorporated, San Diego, CA (US)

(72) Inventors: Navid Abedini, Raritan, NJ (US); Sundar Subramanian, San Diego, CA (US); Muhammad Nazmul Islam, Edison, NJ (US); Tao Luo, San Diego, CA (US); Bilal Sadiq, Basking Ridge, NJ (US); Hung Ly, San Diego, CA (US); Heechoon Lee, San Diego, CA (US); Haitong Sun, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/967,073

(22) Filed: Apr. 30, 2018

(65) Prior Publication Data

US 2018/0324686 A1 Nov. 8, 2018

Related U.S. Application Data

(60) Provisional application No. 62/502,216, filed on May 5, 2017.

(51) Int. Cl.
| | |
|---|---|
| *H04W 4/00* | (2018.01) |
| *H04W 48/16* | (2009.01) |
| *H04W 56/00* | (2009.01) |
| *H04L 12/58* | (2006.01) |
| *H04W 4/12* | (2009.01) |

(Continued)

(52) U.S. Cl.
CPC ......... *H04W 48/16* (2013.01); *H04W 56/001* (2013.01); *G06Q 50/01* (2013.01); *H04L 51/12* (2013.01); *H04M 1/72519* (2013.01); *H04M 1/72522* (2013.01); *H04W 4/12* (2013.01); *H04W 8/245* (2013.01)

(58) Field of Classification Search
CPC ... H04W 48/16; H04W 56/001; H04W 8/245; H04W 88/02; H04W 1/72522; H04M 1/72519; H04B 1/7073; H04B 1/7183; H04J 3/0617
USPC .................. 455/434, 550.1, 418; 370/350
See application file for complete search history.

(56) References Cited

U.S. PATENT DOCUMENTS

| | | | |
|---|---|---|---|
| 6,415,157 B1 * | 7/2002 | Kato ................... | H04B 7/2662 375/356 |
| 2011/0007214 A1 * | 1/2011 | Defoug ................. | H04H 20/26 348/500 |

(Continued)

*Primary Examiner* — Danh C Le
(74) *Attorney, Agent, or Firm* — Arent Fox, LLP

(57) ABSTRACT

In order to improve cell detection in NR, a user equipment apparatus performs a PSS search on a first frequency raster from a group of frequency rasters. When the UE detects a PSS on the first frequency raster corresponding to a PSS hypothesis, the UE searches for an SS on a second frequency raster based at least on part on the detected PSS hypothesis on the first frequency raster. The UE may search for a plurality of hypotheses of the SS corresponding to the detected PSS hypothesis on the first frequency raster and the second frequency raster. The second frequency raster may be selected from the group of frequency rasters based at least in part on the detected PSS hypothesis or the first frequency raster on which the PSS was detected.

17 Claims, 10 Drawing Sheets

(51) Int. Cl.
  *G06Q 50/00* (2012.01)
  *H04W 8/24* (2009.01)
  *H04M 1/725* (2006.01)

(56) References Cited

U.S. PATENT DOCUMENTS

| | | | |
|---|---|---|---|
| 2012/0115518 A1* | 5/2012 | Zeira | H04W 8/005 |
| | | | 455/500 |
| 2013/0230012 A1* | 9/2013 | Lipka | H04W 48/16 |
| | | | 370/329 |
| 2015/0016339 A1* | 1/2015 | You | H04J 11/0073 |
| | | | 370/328 |
| 2015/0057033 A1* | 2/2015 | Schliwa-Bertling | H04W 4/70 |
| | | | 455/458 |
| 2015/0373655 A1* | 12/2015 | Takano | H04W 56/00 |
| | | | 370/350 |
| 2016/0286506 A1* | 9/2016 | Chae | H04W 56/002 |
| 2017/0005848 A1* | 1/2017 | Zheng | H04W 56/00 |
| 2017/0048787 A1* | 2/2017 | Lindoff | H04J 11/0069 |
| 2017/0164308 A1* | 6/2017 | Ji | H04W 48/16 |
| 2017/0181134 A1* | 6/2017 | Niu | H04B 17/318 |
| 2017/0280403 A1* | 9/2017 | Kim | H04W 56/00 |
| 2018/0054786 A1* | 2/2018 | Yamada | H04L 7/04 |
| 2018/0124743 A1* | 5/2018 | Seo | H04L 1/18 |
| 2018/0146439 A1* | 5/2018 | Kim | H04W 52/283 |

\* cited by examiner

FREQUENCY SCAN IN NR WIRELESS COMMUNICATION

CROSS-REFERENCE TO RELATED APPLICATION

This application claims the benefit of U.S. Provisional Application Ser. No. 62/502,216, entitled "Frequency Scan in NR Wireless Communication" and filed on May 5, 2017, which is expressly incorporated by reference herein in its entirety.

BACKGROUND

Field

The present disclosure relates generally to communication systems, and more particularly, to a user equipment performing a frequency scan.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

During initial acquisition, a user equipment (UE) may need to perform a search for a synchronization signal on different frequency rasters in order to look for a cell to which the UE can connect. The need to search multiple frequency rasters can lead to challenges in efficiently and accurately finding a cell to which the UE can connect.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present application provides aspects to improve cell detection in 5G NR wireless communication systems.

In an aspect of the disclosure, a method, a computer-readable medium, and an apparatus are provided for wireless communication at a UE. The apparatus performs a primary synchronization signal (PSS) search on a first frequency raster from a group of frequency rasters. When the UE detects a PSS on the first frequency raster corresponding to a PSS hypothesis, the UE searches for a synchronization signal on a second frequency raster based at least in part on the detected PSS hypothesis on the first frequency raster. The UE may search for a plurality of hypotheses of the SS corresponding to the detected PSS hypothesis on the first frequency raster and the second frequency raster. The SS may comprise an additional PSS and/or a secondary synchronization signal (SSS). The UE may perform the SS search on a second frequency raster from a group of frequency rasters. The second frequency raster may be selected from the group of frequency rasters based on the PSS hypothesis of the detected PSS.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
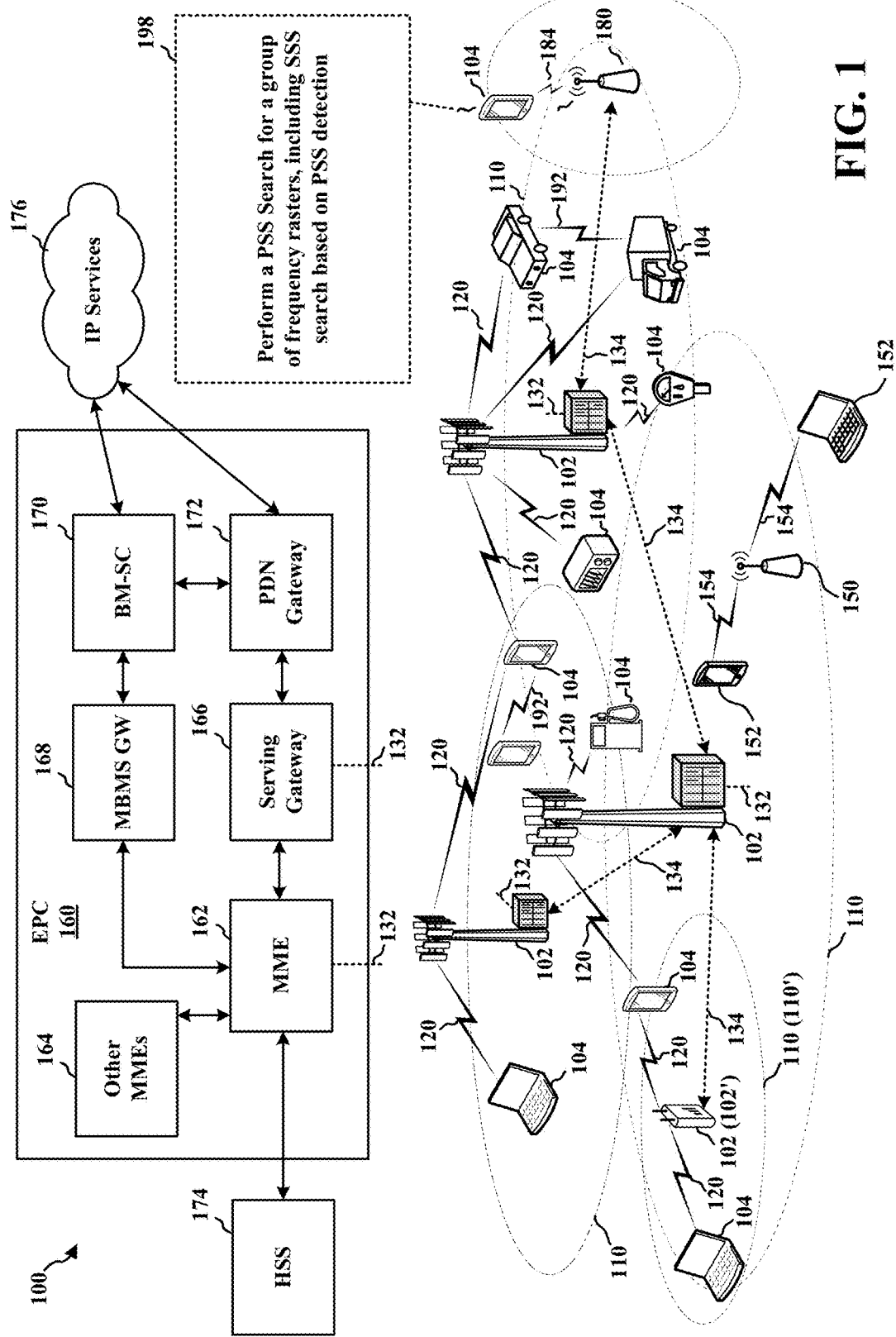
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ 5G NR and use the same 5 GHz unlicensed frequency spectrum as used by the Wi-Fi AP 150. The small cell 102', employing 5G NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to perform a PSS search for a list or other group of frequency rasters including performing an PSS/SSS search on a second frequency raster based on a PSS detection on a first frequency raster (198), e.g., as described in connection with FIGS. 5-8.

Figure 2:
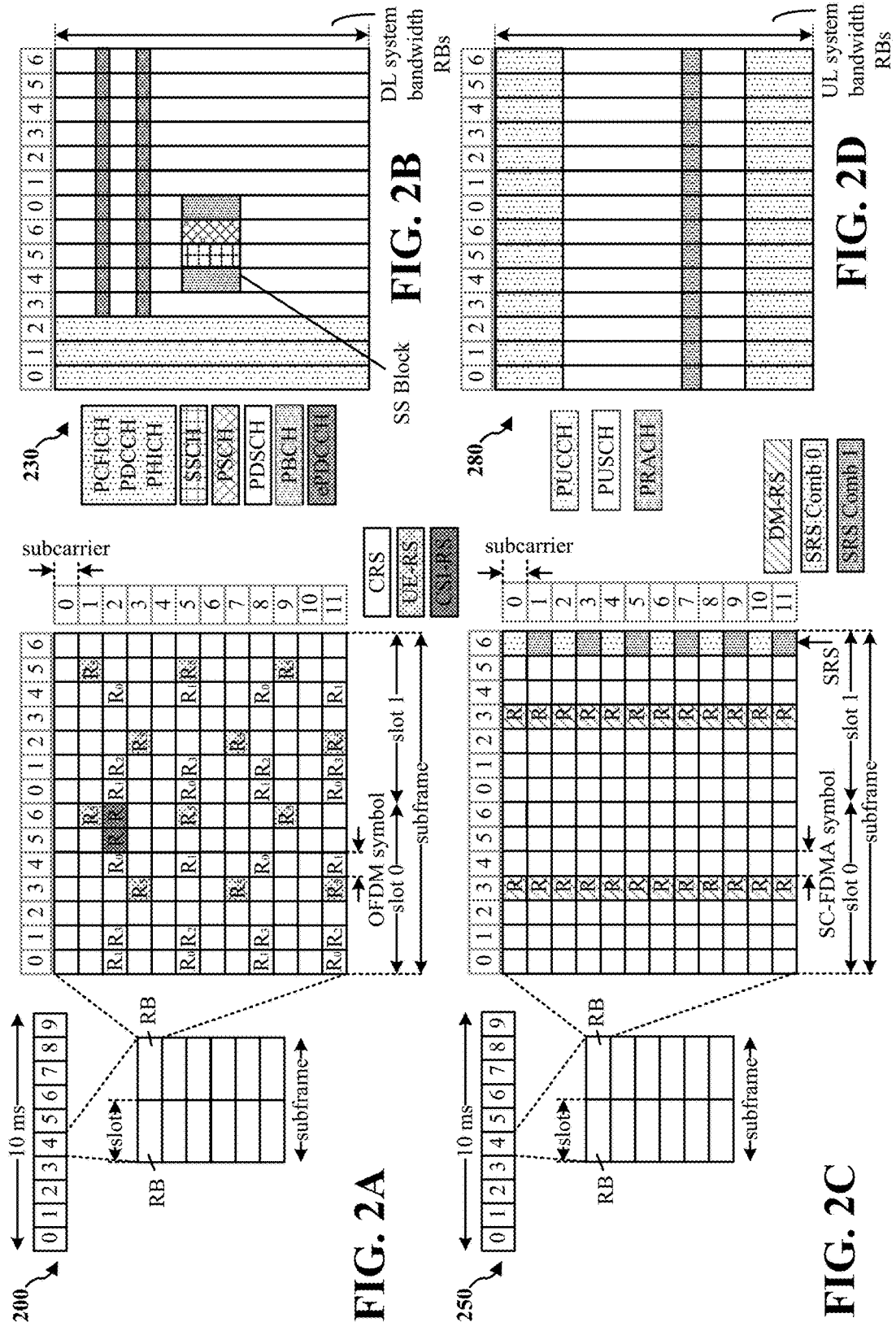
FIGS. 2A, 2B, 2C, and 2D are diagrams illustrating examples of a DL frame structure, DL channels within the DL frame structure, an UL frame structure, and UL channels within the UL frame structure, respectively.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
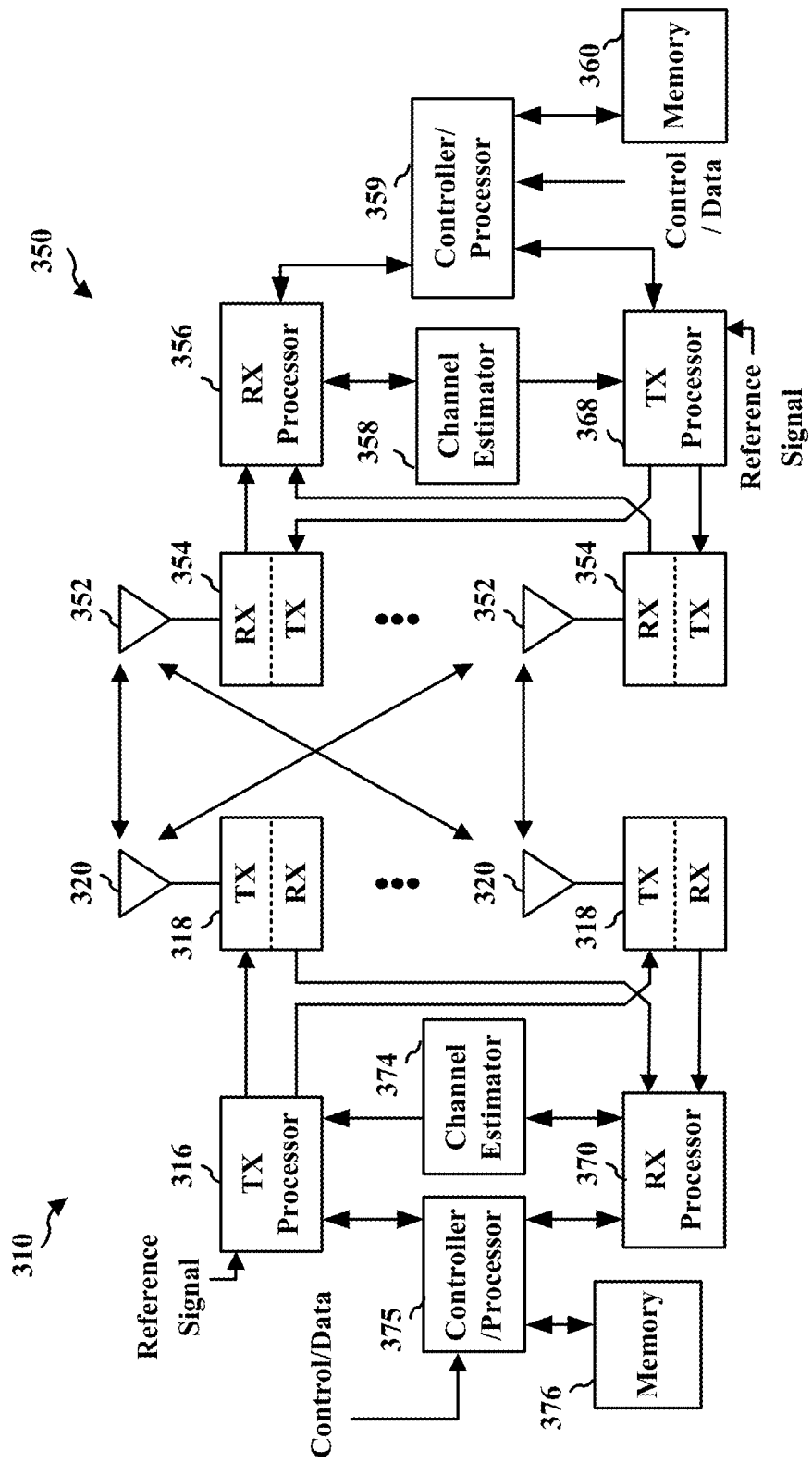
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
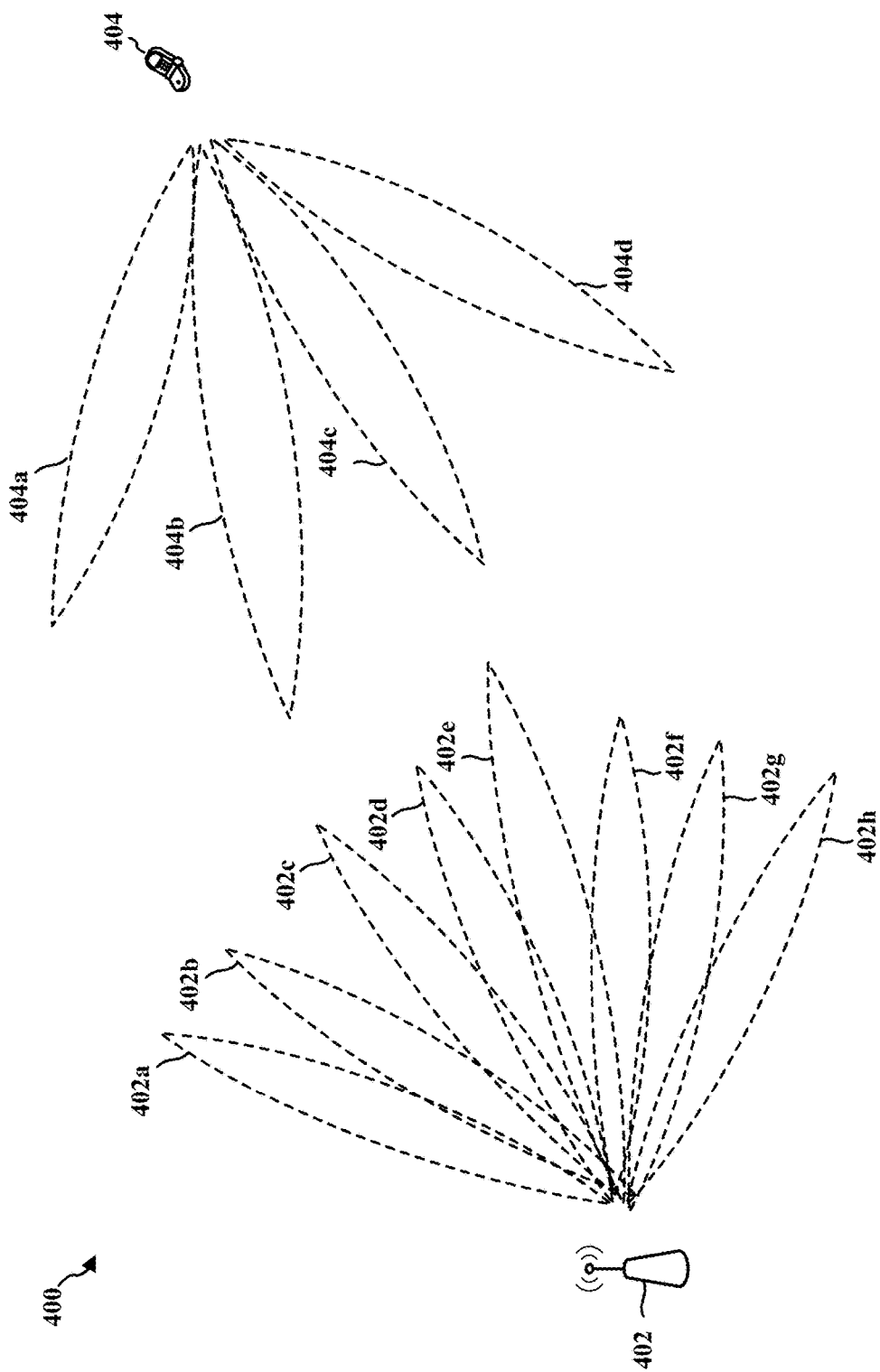
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

During an initial acquisition, e.g. when a UE device, such as UE 104, powers up, the UE may need to search a list of frequency locations to find a cell in order to connect to the cell. Such frequency locations are also referred to herein as "frequency rasters." The UE may perform a frequency scan according to the list of frequency rasters to attempt to detect a cell. A frequency scan operation may include going through a list of rasters, e.g., one by one in order. One each raster, the UE may perform a frequency scan to attempt to find a cell. For example, on each raster, the UE may attempt to detect a reference signal, e.g., a synchronization signal, in order to detect the cell.

If the UE detects the reference signal, e.g., finds a cell, the UE returns a detection for that cell. For example, the UE may determine that the UE has found a cell or may declare a cell detection. At this point, the UE may either continue searching for a cell on the other frequency rasters or may stop the search.

If the UE does not find a cell, e.g., does not detect a synchronization signal, during a period of time, e.g., a predefined dwell time T, the UE may proceed to perform the frequency scan on the next frequency raster on the list. One example, of a dwell time T is 80 ms. If the UE does not detect a synchronization signal on the frequency raster for 80 ms, the UE may conclude that there is no cell on the frequency raster.

In LTE, frequency rasters are 100 KHz apart, and there may be many rasters in a frequency band over which the UE will search. The frequency rasters in 5G NR may comprise a different frequency separation that LTE frequency rasters, e.g., more than 100 KHz separation. As one example, for sub-6 GHz communication, example frequency separation sizes may comprise 120 KHz, 240 KHz, or even more. While providing sparser frequency rasters may reduce the number of frequency rasters to be scanned within the frequency bandwidth, there is still a need for a UE to perform an initial frequency scan in a more efficient manner in NR.

In NR, a synchronization signal may comprise an NR-Primary Synchronization Signal (NR-PSS). There may be multiple PSS sequences generated based on different cyclic shifts of a base sequence in a frequency domain. For example, three PSS sequences may be generated by one of three different cyclic shifts of a base sequence in a frequency domain. This is different than LTE, which involves 3 different Zadoff-Chu sequences. An NR-PSS may include a frequency domain-based pure BPSK M sequence having one polynomial base sequence, e.g., Decimal 145 (i.e., $g(x)=x^7+x^4+1$ is the polynomial used to generate the base M sequences), and the initial poly shift register value may be 1110110. The base sequence is then used to create three PSS sequences, e.g., PSS1, PSS2, and PSS3 through the use of 3 different cyclic shifts. One example of three cyclic shifts is (0, 43, 86), where PSS1 may be generated without a cyclic shift, PSS2 may be generated through a cyclic shift of 43 samples on the base sequence, and PSS3 is generated through a cyclic shift of 86 samples on the base sequence. Each sample maps to a tone. Therefore the cyclic shift of 43 samples or 86 samples may also be referred to as a shift of 43 tones or 86 tones.

Due to the structure of the NR-PSS, there is a potential problem where a UE may be performing a PSS search on one frequency raster, but may detect a cyclic shift of a PSS on a different frequency raster. For example, if a cell is transmitting a PSS1 on a frequency raster m, a UE searching a different frequency raster k that is about 43 tones apart from raster m, may detect the PSS1. The UE searches for all three PSS candidates on frequency raster k. As the PSS2 candidate is a cyclically shifted version of PSS1, e.g., by 43 samples, this gives a high cross-correlation with PSS1 transmitted on frequency raster m that is about 43 tones apart from raster k. The UE may incorrectly determine that it has detected a PSS corresponding to frequency raster k, whereas the cell is actually transmitting the PSS on frequency raster m.

Figure 5:
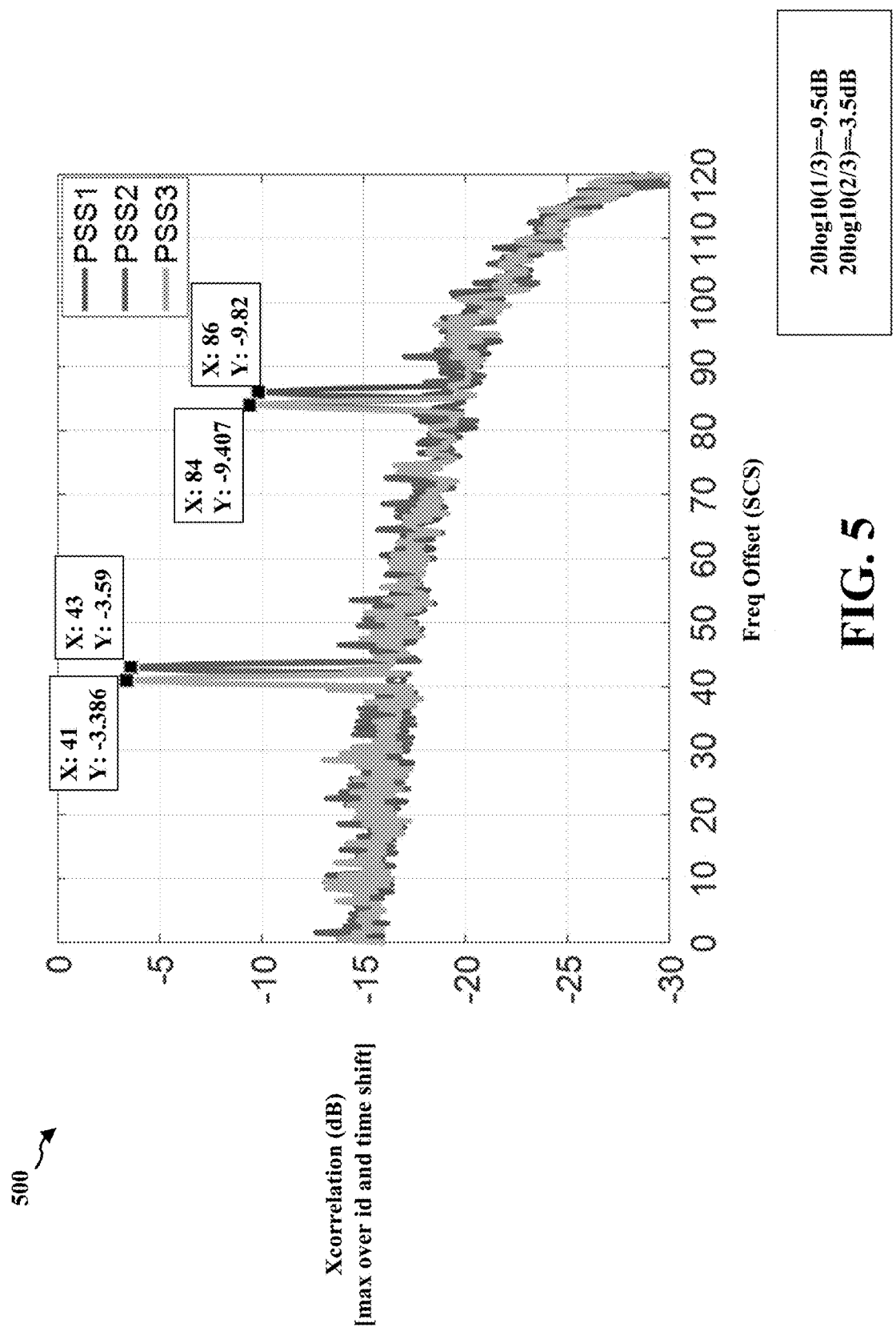
FIG. 5 illustrates a graph showing cross correlation between PSS candidates on different frequency rasters.

FIG. 5 illustrates a graph 500 that shows an example of a measured cross correlation on the vertical axis according to a frequency offset on the horizontal axis for three PSS candidates PSS1, PSS2, and PSS3. For example, for PSS candidates involving a cyclic shift of (0, 43, 86), there is a high cross-correlation shown at a frequency offset of approximately 43 and 86.

Figure 6:
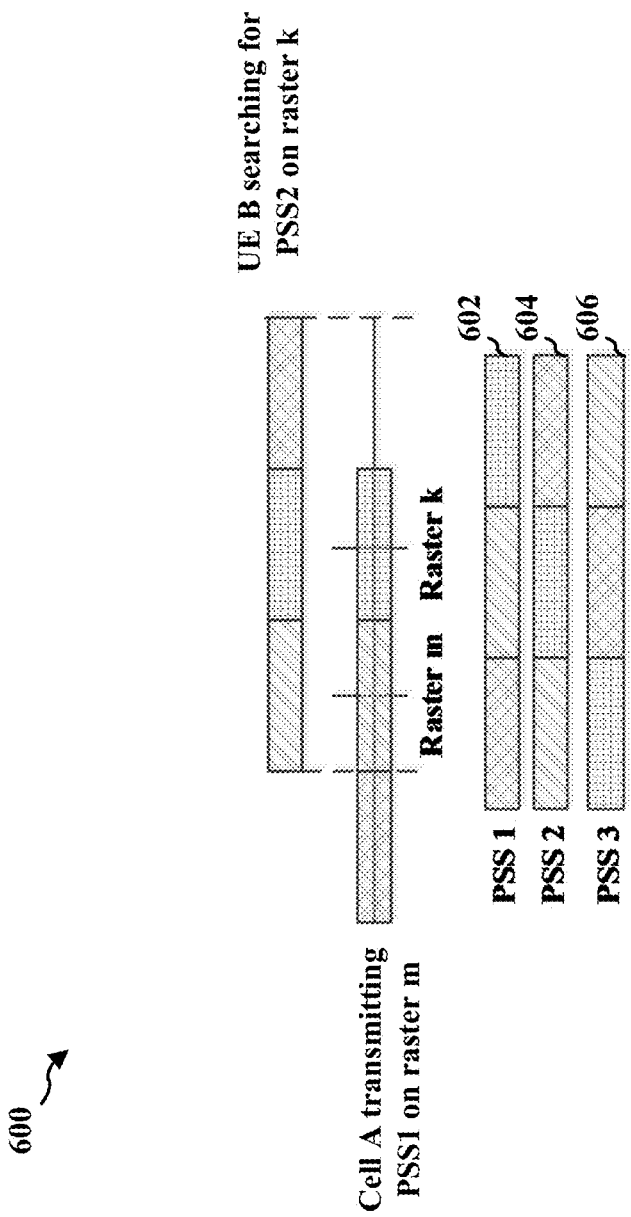
FIG. 6 is an illustration showing cross correlation between PSS candidates on different frequency rasters.

FIG. 6 illustrates 3 PSS candidates, PSS1 602, PSS2 604, and PSS3 606. In FIG. 6, Cell A transmits PSS1 on frequency raster m. A UE searches for PSS2 on raster k. Due to the frequency spacing between the frequency rasters m and k and the cyclic shift between PSS1 and PSS2, the UE may detect PSS1 on frequency raster m and may mistakenly conclude that it has detected PSS2 on frequency raster k.

Figure 7:
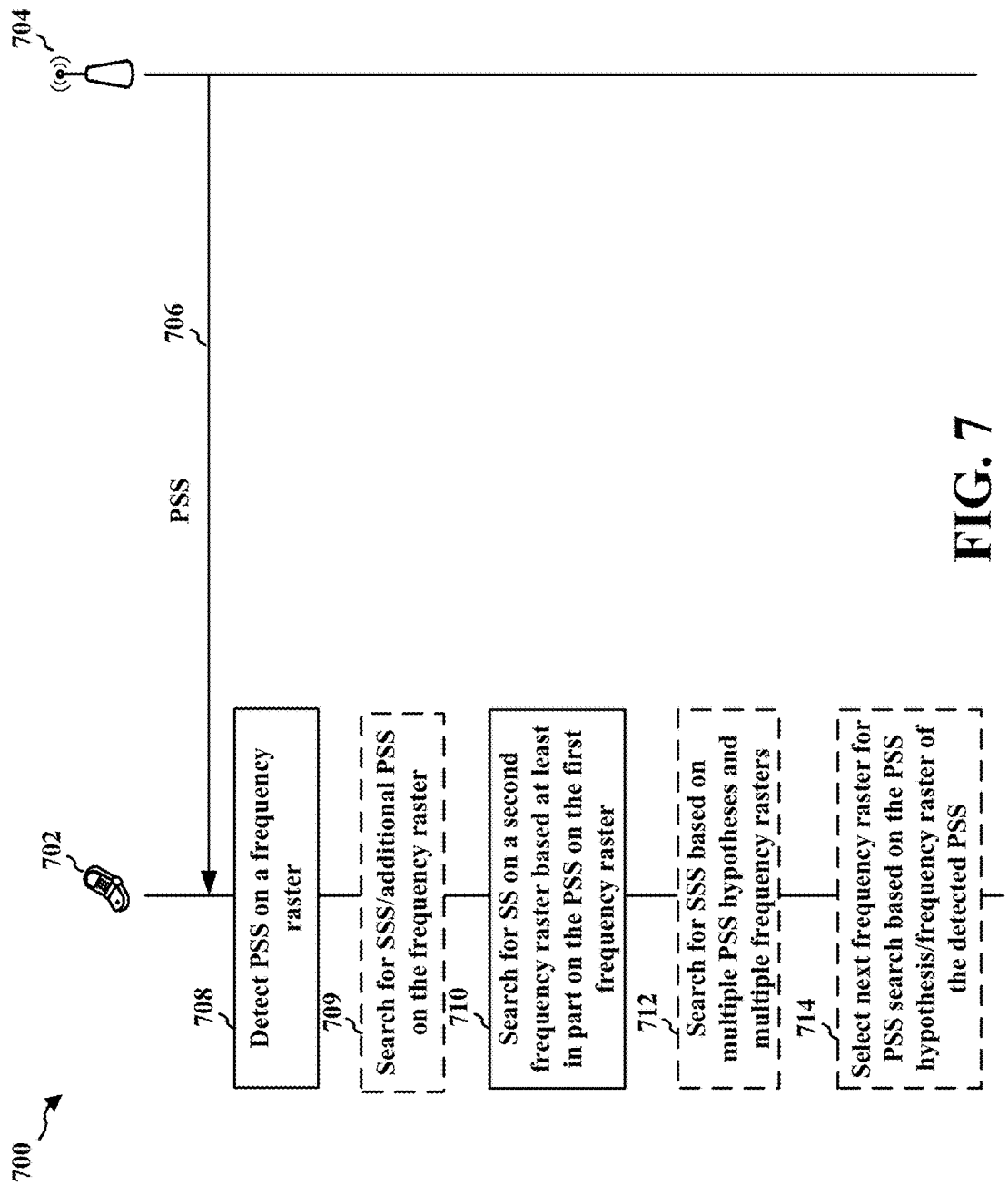
FIG. 7 is a diagram illustrating an example of wireless communication between a UE and a base station.

The present application provides a solution to this problem of mistaken PSS detection by the UE. The present application further provides a way to improve the efficiency of the frequency scan performed by the UE over the list of frequency rasters. The aspects of the present application enable the UE to more accurately detect a cell in a more efficient manner. FIG. 7 illustrates an example wireless communication system 700 involving wireless communication between a UE 702 and a base station 704. UE 702 may correspond to UE 104, 350, 404. Base station 704 may correspond to base station 180, 310, 402.

When a UE is searching over a list of frequency rasters, the UE may begin on a given frequency raster and may run a PSS searcher to attempt to detect any of the three PSS candidates on the frequency raster. The PSS searcher may be based on a correlator that correlates received samples with the different PSS candidates (e.g., PSS1, PSS2, PSS3) for different time hypotheses within a search window of time, and for one or multiple carrier frequency offset hypotheses. Thus, the PSS searcher may attempt to detect any of the different PSS candidates within a search window of time and frequency. The synchronization signals PSS (and similarly SSS) may be determined to be detected when a corresponding correlation is determined to pass a threshold.

A detected PSS will correspond to a PSS hypothesis having a time, frequency, and PSS candidate identifier. The PSS candidate identifier (PSS id) indicates to which of the three PSS candidates the PSS hypothesis corresponds.

When a UE 702 detects 708 a PSS 706 transmitted from base station 704, the UE 702 then attempts to detect 710 a SS (either PSS/SSS) on a second frequency raster based, at least in part, on the detection of the PSS at 708. The second frequency raster may be selected from a group of frequency rasters based at least in part on the detected PSS hypothesis or the first frequency raster on which the PSS was detected. The UE may also search for an SSS at 709 (or an additional PSS) corresponding to the detected PSS hypothesis (in time, frequency, and PSS id) on the same frequency raster and may search for the SS on the second frequency raster when no SSS/additional PSS is detected on the first raster corresponding to the PSS within a time period. For the example in which the UE detects PSS2 on frequency raster k, the UE may then attempt to detect an SSS corresponding to PSS2 on frequency raster k for the corresponding window of time.

If the UE detects a PSS and SSS successfully, then the UE may declare a cell detection on the corresponding frequency raster, because the detection of the SSS confirms that the UE correctly detected the PSS according to the PSS hypothesis. The declaration of cell detection may potentially come after further processing, e.g., physical broadcast channel (PBCH) decoding.

If the UE does not detect an SSS according to the PSS hypothesis on the same frequency raster, the UE may determine that the PSS hypothesis was not correctly detected and may continue to perform the PSS search on the frequency raster. For example, the UE may continue to check the frequency raster for each of the PSS candidates for the duration of the dwell time T. If UE does not find a cell within a dwell time, the UE may continue to check the next raster in the list of frequency rasters.

In one optional aspect, the UE may also use an understanding of a relationship between the cyclic shifts of the PSS candidates and the frequency spacing of the frequency rasters to perform additional searching based on the detected PSS. For example, rather than merely searching the same frequency raster on which the PSS was detected and the same PSS hypothesis, the UE may check multiple hypotheses for SS (either SSS or additional PSS) detection on multiple frequency raster positions based on the detected PSS hypothesis at 712. The multiple SSS hypotheses and multiple frequency rasters may be determined based on the detected PSS and its corresponding PSS hypothesis in time, frequency, and PSS ID and may also be based on the cyclic shift between PSS candidates and frequency separation of the frequency rasters.

For example, based on detecting PSS2 on frequency raster k in FIG. 6, the UE may check for an SSS corresponding to PSS2 on frequency raster k and may also check for an SSS corresponding to PSS1 on frequency raster m, based on the detected PSS hypothesis and the corresponding cyclic shift between PSS1 and PSS2 and the frequency spacing of frequency rasters k and m.

If the UE detects a SSS successfully corresponding to one of the SSS hypotheses, the UE may declare a cell detection on the corresponding frequency raster. For example, the UE in FIG. 6 would detect an SSS for PSS1 on frequency raster m and would declare a cell detection on frequency raster m. The declaration may potentially occur after further processing, e.g., PBCH decoding.

If the UE does not detect an SSS, the UE may continue to perform the PSS search on the frequency raster. For example, the UE may continue to check the frequency raster for each of the PSS candidates for the duration of the dwell time T. If UE does not find a cell within a dwell time, the UE may continue to check the next raster in the list of frequency rasters.

The processing of multiple SSS hypotheses may be performed in parallel or sequentially one after another. The order may be based on previous processing.

In another option, when a UE does not find a cell within a dwell time, the UE may select a next frequency raster to be checked from the list of frequency rasters based on the detected PSS 714. Therefore, the UE may use the detected PSS 706 to further guide the frequency scan, even when the UE determines that a cell is not detected for the corresponding PSS hypothesis.

For example, if the UE in FIG. 6 performs the PSS searcher for frequency raster k and detects PSS2, but does not detect a cell on frequency raster k, the UE may select frequency raster m as the next frequency raster to be searched for a cell, e.g., based on the detected PSS. Using a relationship between the detected PSS hypothesis, the cyclic shift between PSS candidates, and/or the frequency separation between frequency rasters, the UE may select a frequency raster that is more likely to have a cell rather than just processing through the frequency raster list in order.

Algorithm parameters for processing on a frequency raster X may depend on frequency raster index X and corresponding PSS hypotheses. The processing on frequency raster X may be limited to only PSS and/or SSS processing for a given time/frequency. For example, the PSS search may be run for a limited window of time and frequency, e.g., based on the previous PSS detection on a different frequency raster.

Figure 8:
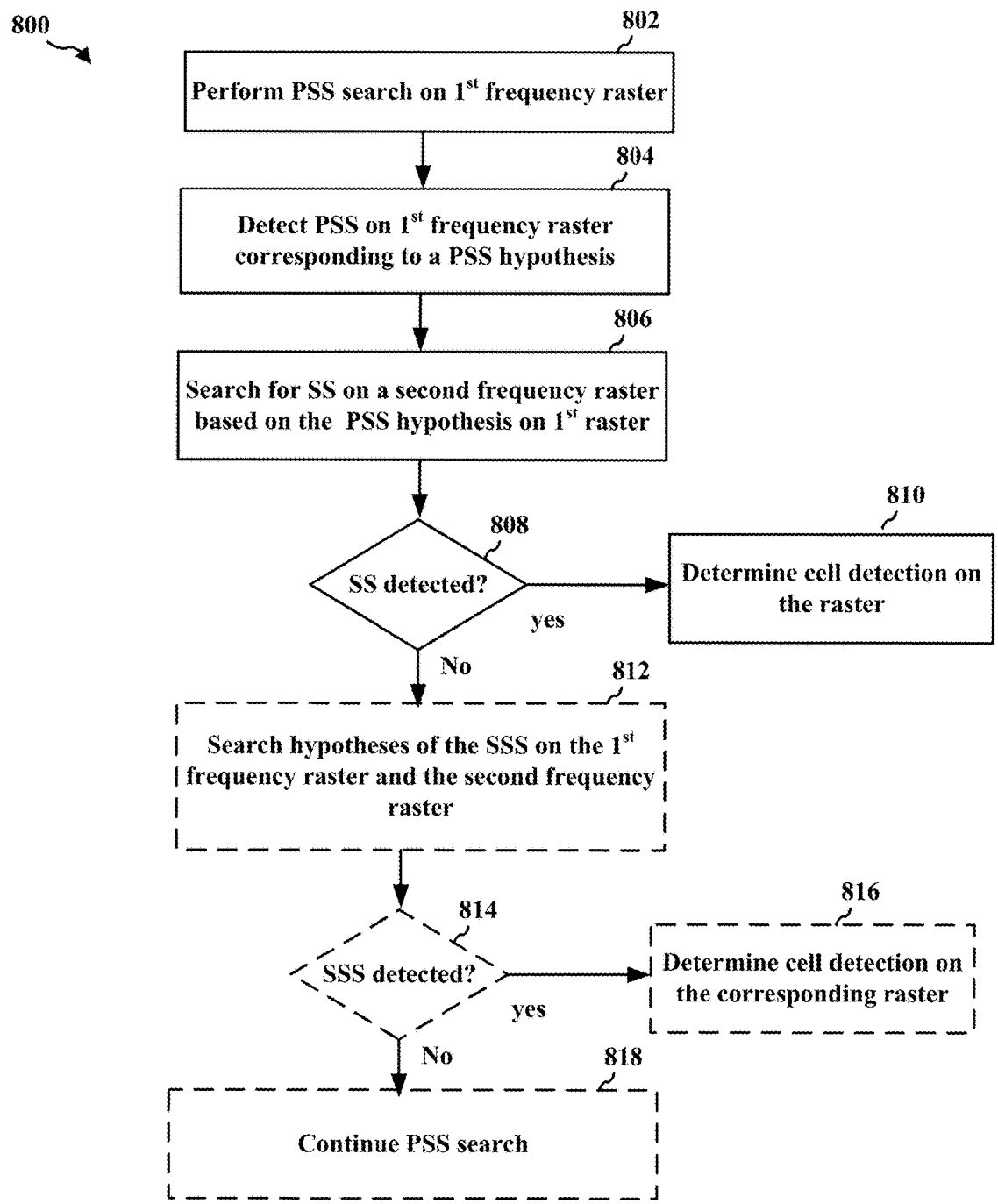
FIG. 8 is a flowchart of a method of wireless communication.

FIG. 8 is a flowchart 800 of a method of wireless communication. The method may be performed by a UE (e.g., UE 104, 350, 404, 702, the apparatus 902, 902') searching for a cell by performing a frequency scan for a synchronization signal from a base station (e.g., base station 180, 310, 402, 704, 950). A cell is detected on a particular raster when at least a PSS and a corresponding SSS are detected on the same raster. The method of FIG. 8 may reduce the latency of detecting a cell on the correct raster by leading the UE to conduct a search on a second raster Y when a PSS is detected on a first raster X. Latency may be reduced because although a PSS is detected on raster X, the actual cell might be on raster Y. Thus, a detection of a PSS on raster X may be used to help to detect a "potential" cell on raster Y with lower latency.

At 802, the UE performs a PSS search on a first frequency raster from a group of frequency rasters. The PSS search may be based on the potential PSS sequences, e.g., PSS1, PSS2, and PSS3 described in connection with FIG. 6. The UE may attempt to correlate a received downlink sample with the different PSS candidates for different time hypotheses within the search window. The correlation may also be based on one or multiple carrier frequency offset hypotheses.

At 804, the UE detects a PSS on the first frequency raster corresponding to a PSS hypothesis, e.g., similar to the UE detected PSS2 on frequency raster k described in connection with FIG. 6. For example, the PSS may be detected when the corresponding correlation passes a threshold.

At 806, the UE searches for an SS on a second frequency raster based at least in part on the detected PSS hypothesis on the first frequency raster. The PSS hypothesis is based on a corresponding time, frequency, and PSS ID. The second frequency raster may be selected from a group of frequency rasters based at least in part on the detected PSS hypothesis or the first frequency raster on which the PSS was detected.

At 808, the UE determines whether the SS is detected. When both a PSS and SSS are detected on a particular raster, the UE may determine a cell detection on the corresponding raster at 810. For example, when if the UE determines that the SS is detected on the second raster, such that both a PSS and SSS are detected on the second raster, the UE may determine a cell detection at 810 on the second raster. The UE may continue the PSS search, e.g., at 818, when no SS is detected corresponding to the detected PSS.

Optional aspects of FIG. 8 are illustrated with a dashed line. At 812, the UE may search for a plurality of hypotheses of the SS corresponding to the detected PSS hypothesis on the first frequency raster and on the second frequency raster.

In one example, the SS may comprise an additional PSS. For example, the SS may comprise an SSS. Thus, at 814, the UE may determine whether an SSS is detected.

THE UE may search for an SSS or an additional PSS on the first frequency raster, as at least in part of the detected PSS hypothesis and may search for the SS on the second frequency raster when no SSS or additional PSS is detected on the first frequency raster corresponding to the detected PSS. The plurality of hypotheses of the SSS may be based on the detected PSS hypothesis.

At 816, the UE determines a cell detection on a corresponding raster when an SSS corresponding to the detected PSS is detected on the corresponding raster, e.g., when both a PSS and SSS are detected on a corresponding raster. The UE may continue the PSS search at 818 when no SSS is detected corresponding to the detected PSS.

For example, when no cell is detected on the first frequency raster, the UE may perform the PSS search on a second frequency raster from the group of frequency rasters at 818, e.g., when a cell is not detected on the first frequency raster within a period of time. The second frequency raster may be selected from the group of frequency rasters based on the PSS hypothesis of the detected PSS. The second frequency raster may be further selected from the group of frequency rasters based on the first frequency raster on which the PSS was detected. The PSS search may be performed on the second frequency raster is limited to a limited set of PSS hypothesis based on the PSS hypothesis of the detected PSS on the first frequency raster.

Figure 9:
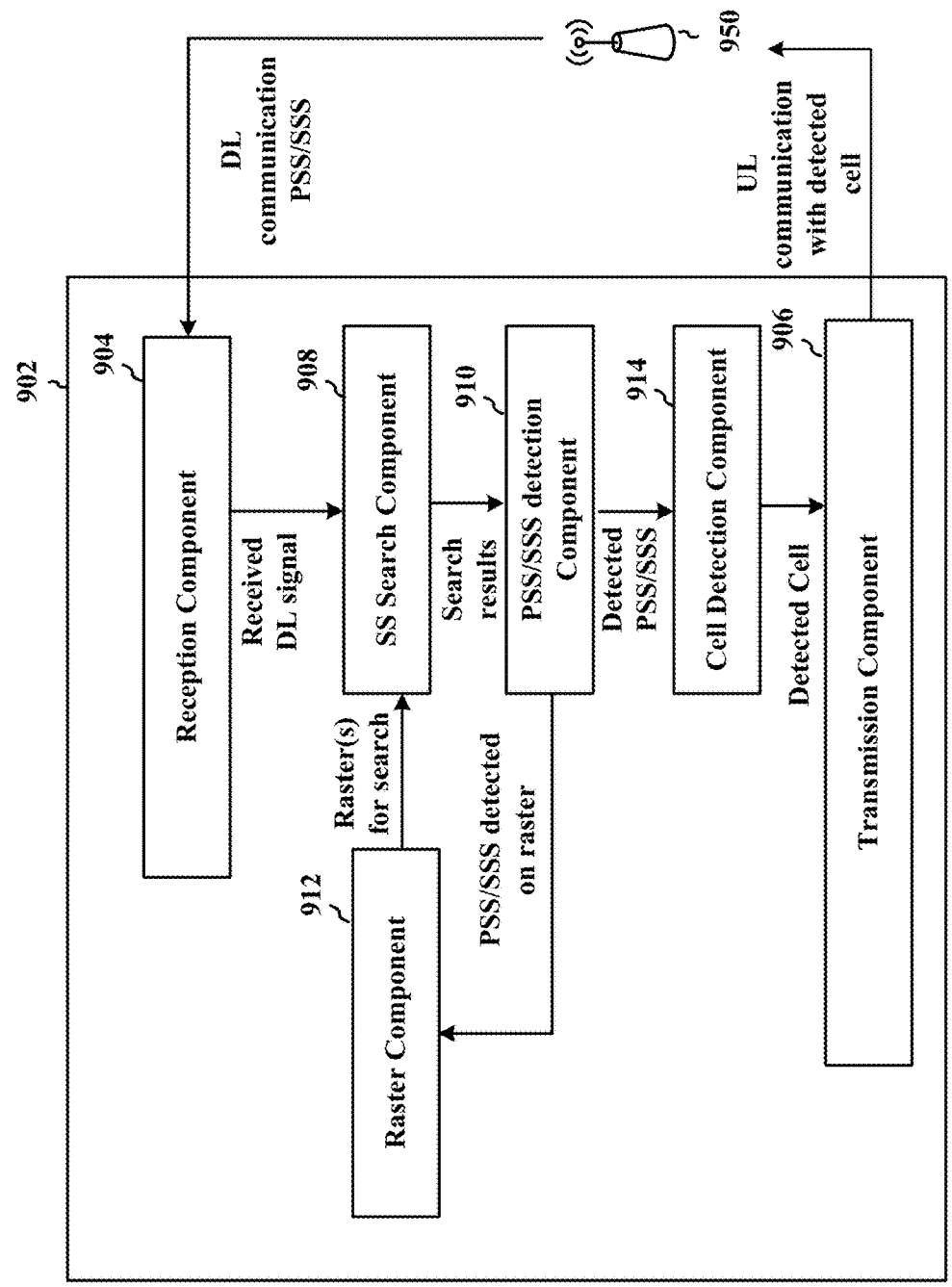
FIG. 9 is a is a conceptual data flow diagram illustrating the data flow between different means/components in an exemplary apparatus.

FIG. 9 is a conceptual data flow diagram 900 illustrating the data flow between different means/components in an exemplary apparatus 902. The apparatus may be a UE (e.g., UE 104, 250, 404, 702, the apparatus 902, 902'). The apparatus includes a reception component 904 that receives downlink communication from a base station 950 and a transmission component 906 that transmits uplink communication with a base station 950.

The apparatus may comprise an SS search component 908 that performs a search for SS signals, as described in connection with FIGS. 4, 6, 7, and 8. For example, the SS search component 908 may be configured to perform a PSS search on a first frequency raster from a group of frequency rasters. The apparatus may include a PSS/SSS detection component 910 configured to detect the PSS on the first frequency raster corresponding to a PSS hypothesis. Then, the SS search component 908 may be configured to search for an SS on a second frequency raster based at least in part on the detected PSS hypothesis on the first frequency raster. Raster component 912 may determine the first frequency raster and/or the second frequency raster. For example, the second frequency raster may be selected from the group of frequency rasters based at least in part on the detected PSS hypothesis and/or the first frequency raster on which the PSS was detected. Thus, the SS search component 908 may be configured to perform additional searches for PSS/SSS, e.g., as described in connection with FIGS. 7 and 8. The apparatus may further comprise a cell detection component 914 configured to determine a cell detection based on the PSS/SSS detection determined at the PSS/SSS detection component 910. For example, a cell detection may be determined on a corresponding raster when an SSS corresponding to the detected PSS is detected on the corresponding raster.

The apparatus may include additional components that perform each of the blocks of the algorithm in the aforementioned flowcharts of FIGS. 7 and 8. As such, each block in the aforementioned flowcharts of FIGS. 7 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
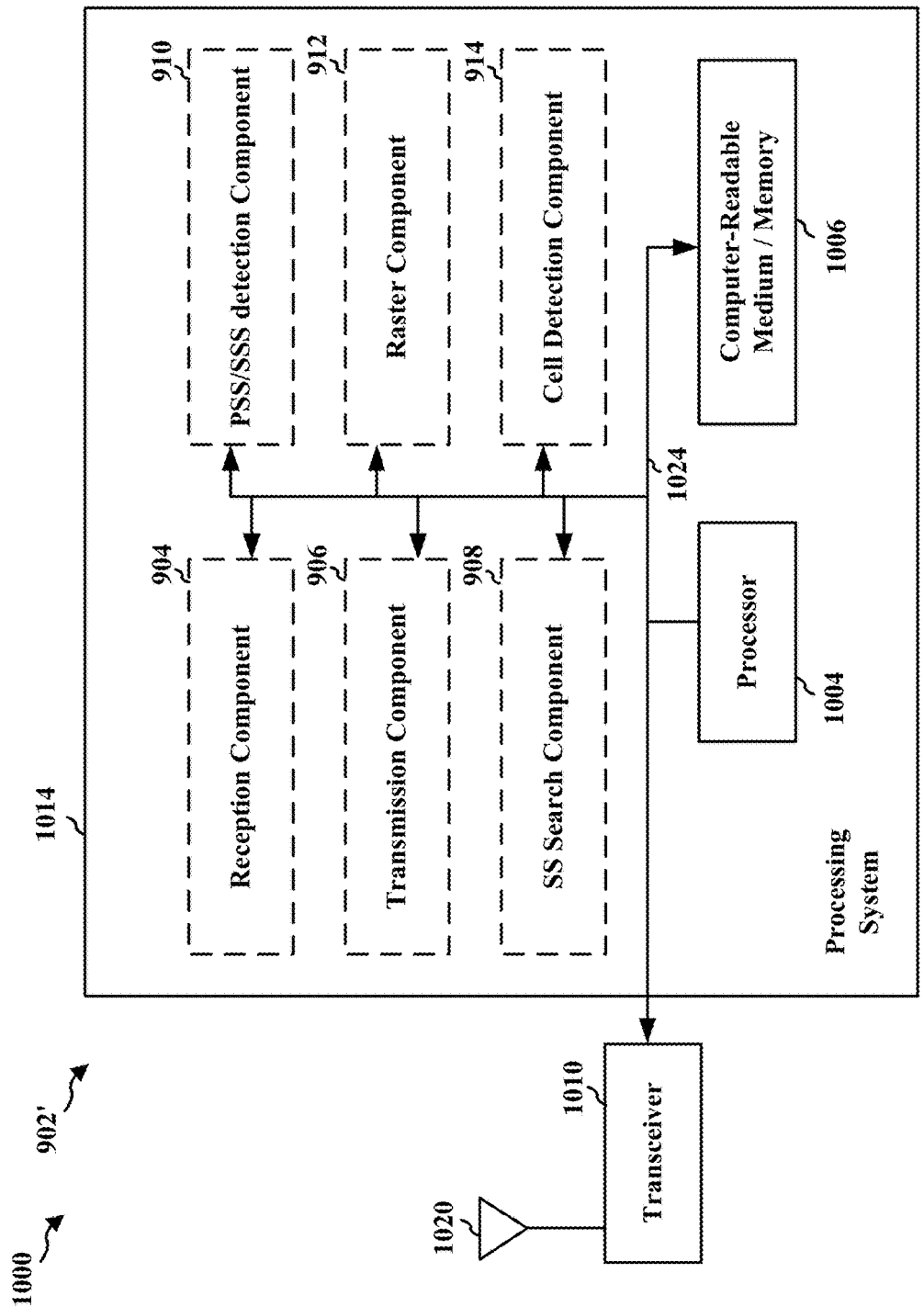
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912, 914, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 906, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910, 912, 914. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359.

In one configuration, the apparatus 902/902' for wireless communication includes means for performing a PSS/SS search on a first/second frequency raster from a group of frequency rasters (e.g., at least SS search component 908); means for detecting a PSS on the first frequency raster corresponding to a PSS hypothesis (e.g., at least PSS/SSS detection component 910); means for searching (e.g., at least SS search component 908 and raster component 912) for an SS on a second frequency raster based at least in part on the detected PSS hypothesis on the first frequency raster; and means for determining a cell detection (e.g., at least cell detection component 914) on a corresponding raster when the SSS corresponding to the detected PSS is detected on the corresponding raster. The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment, comprising:
    performing a primary synchronization signal (PSS) search on a first frequency raster from a group of frequency rasters;
    detecting a PSS on the first frequency raster corresponding to a PSS hypothesis;
    searching for a secondary synchronization signal (SSS) on the first frequency raster, based at least in part on the PSS hypothesis of the detected PSS; and
    searching for a synchronization signal on a second frequency raster when no SSS is detected on the first frequency raster corresponding to the detected PSS, wherein the UE searches for the synchronization signal based at least in part on the PSS hypothesis of the detected PSS on the first frequency raster, a cyclic shift between synchronization signal candidates, and a frequency separation between the first frequency raster and the second frequency raster.

2. The method of claim 1, wherein the PSS hypothesis is based on a corresponding time, frequency, and PSS identifier (ID).

3. The method of claim 1, wherein the second frequency raster is selected from the group of frequency rasters based at least in part on the PSS hypothesis of the detected PSS or the first frequency raster on which the PSS was detected.

4. The method of claim 1, wherein the synchronization signal is another secondary synchronization signal (SSS).

5. The method of claim 4, further comprising:
searching for a plurality of hypotheses of the SSS corresponding to the PSS hypothesis of the detected PSS on the first frequency raster and the second frequency raster.

6. The method of claim 5, further comprising:
determining a cell detection on a corresponding raster when the SSS corresponding to the detected PSS is detected on the corresponding raster; and
continuing the PSS search when no SSS is detected corresponding to the detected PSS.

7. The method of claim 5, wherein the plurality of hypotheses of the SSS is determined based on the PSS hypothesis of the detected PSS.

8. The method of claim 1, wherein the synchronization signal comprises an additional PSS.

9. The method of claim 8, wherein the PSS search performed on the second frequency raster is limited to a limited set of PSS hypothesis based on the PSS hypothesis of the detected PSS on the first frequency raster.

10. The method of claim 1, further comprising:
selecting the second frequency raster from the group of frequency rasters based at least in part on the detected PSS or the first frequency raster on which the PSS was detected.

11. A method of wireless communication at a user equipment, comprising:
performing a primary synchronization signal (PSS) search on a first frequency raster from a group of frequency rasters;
detecting a PSS on the first frequency raster corresponding to a PSS hypothesis;
searching for at least one of a secondary synchronization signal (SSS) or additional PSS hypothesis on the first frequency raster; and
searching for a synchronization signal on a second frequency raster, when no SSS or no additional PSS hypothesis is detected on the first frequency raster within a time period, wherein the UE searches for the synchronization signal based at least in part on the PSS hypothesis of the detected PSS on the first frequency raster, a cyclic shift between synchronization signal candidates, and a frequency separation between the first frequency raster and the second frequency raster.

12. An apparatus for wireless communication, comprising:
a memory; and
at least one processor coupled to the memory and configured to:
perform a primary synchronization signal (PSS) search on a first frequency raster from a group of frequency rasters;
detect a PSS on the first frequency raster corresponding to a PSS hypothesis;
search for a secondary synchronization signal (SSS) on the first frequency raster, based at least in part on the PSS hypothesis of the detected PSS; and
search for a synchronization signal on a second frequency raster when no SSS is detected on the first frequency raster corresponding to the detected PSS, wherein the apparatus searches for the synchronization signal based at least in part on the PSS hypothesis on the first frequency raster, a cyclic shift between synchronization signal candidates, and a frequency separation between the first frequency raster and the second frequency raster.

13. The apparatus of claim 12, wherein the PSS hypothesis is based on a corresponding time, frequency, and PSS identifier (ID).

14. The apparatus of claim 12, wherein the second frequency raster is selected from the group of frequency rasters based at least in part on the PSS hypothesis of the detected PSS or the first frequency raster on which the PSS was detected.

15. The apparatus of claim 12, wherein the synchronization signal is another secondary synchronization signal (SSS).

16. The apparatus of claim 14, wherein the at least one processor is further configured to:
search for a plurality of hypotheses of the SSS corresponding to the PSS hypothesis of the detected PSS on the first frequency raster and the second frequency raster.

17. The apparatus of claim 12, wherein the synchronization signal comprises an additional PSS.

* * * * *